March 29, 1949. S. M. WEISBERG ET AL 2,465,772

PREPARATION OF ALKYL LACTATES

Original Filed Feb. 17, 1944

INVENTORS
SAMUEL M. WEISBERG
EDWIN G. STIMPSON
ALFRED L. MILLER
by Hoguet Neary Campbell
their ATTORNEYS Patented Mar. 29, 1949

2,465,772

UNITED STATES PATENT OFFICE 2,465,772

PREPARATION OF ALKYL LACTATES

Samuel M. Weisberg and Edwin G. Stimpson, Baltimore, Md., and Alfred L. Miller, State College, Pa., assignors, by mesne assignments, to National Dairy Research Laboratories, Inc., New York, N. Y., a corporation of Delaware Original application February 17, 1944, Serial No. 522,712. Divided and this application August 23, 1945, Serial No. 612,280

6 Claims. (Cl. 260—484)

This invention relates to the production of alkyl esters of lactic acid. It relates particularly to the production of water-soluble alkyl lactates from lactic acid. This is a division of our application Serial No. 522,712, filed February 17, 1944, now Patent No. 2,390,140, dated December 4, 1945.

As disclosed in the Weisberg et al. application Serial No. 468,184, filed December 8, 1942, now Patent No. 2,406,648, dated August 27, 1946, water-soluble alkyl lactates may be produced by esterifying an aliphatic alcohol with an alkali metal or alkaline earth metal lactate in the presence of an acid catalyst, at a pH value between about 0.7 and 1.4 to obtain a substantially quantitative conversion of the lactate salt to the alkyl lactate.

The esterification reaction requires an extended period of time, for example, one-half to six hours, to go to completion, after which the ester is separated together with water and alcohol from the solid components present in the reaction chamber by flash distillation, for example, in a heated oil bath. The alcohol and water are separated, successively, by distillation and azeotropic distillation to produce a substantially anhydrous ester.

The above generally described method is quite satisfactory with the exception that the process requires too much time, is not particularly well adapted to continuous operation, and contamination of the solid components and ester by, and loss of, the oil during flash distillation sometimes occurs.

An object of the present invention is to provide a simplified and continuous method of producing alkyl esters of lactic acid in a minimum amount of time.

Another object of the invention is to provide a method of producing water-soluble alkyl esters of lactic acid in which esterification is conducted continuously and in a relatively short period of time with immediate separation of the ester and other volatiles from solids present during the reaction.

Other objects of the present invention will become apparent from the following description of typical methods embodying the present invention.

In accordance with the present invention an aliphatic alcohol, for example, methyl, ethyl or propyl alcohol is reacted with substantially water-free lactic acid (less than 25% water) in the presence of a strong mineral acid under conditions of temperature such that esterification proceeds to completion substantially instantaneously and the ester and other volatiles are flash distilled from any solids present or formed during the reaction.

In order to obtain a substantially quantitative yield of the ester, it has been found desirable to have a relatively large excess of the alcohol present during the reaction, for example, about three to twenty parts of alcohol to one part of lactic acid (calculated on a 100% basis) by weight so that the mass reaction effect is such as to force the reaction in the proper direction. Moreover, the reaction is conducted preferably at a pH value between 0.7 and 1.4, inasmuch as it has been found that the reaction will not go to completion at a higher pH value. The pH value may be determined in any suitable way, either during mixing or on the basis of analyses of samples prior to mixing.

During the mixing operation the mixture may be preheated either continuously or in batches, to below the boiling point of the ester, and at about or slightly below the boiling point of the alcohol, for example, to about 150° F. when producing methyl lactate to conserve heat demand in the flash chamber.

The preheated mixture is then fed continuously into a flash chamber heated to above the boiling point of the mixed vapors of ester, alcohol and water. Upon entry into the chamber, the mixture reacts almost instantaneously and flashes into a vapor containing the ester, excess alcohol and water.

The volatile components may be condensed and then further treated in order to separate the alcohol and the water from the ester. The alcohol may be removed readily by distillation or fractionation inasmuch as the boiling points of the alcohol, water and ester are sufficiently far apart that a substantially clean separation may be obtained.

The water may be separated from the water-soluble esters by distilling it as an azeotropic mixture by adding, prior to or during heating, a suitable organic agent which forms an azeotropic mixture with water, boiling at a temperature below the boiling point of the ester. Many of the water-insoluble alcohols, ethers, ketones, hydrocarbons and esters are suitable for this purpose. Among the alcohols found useful are butanol, iso-butyl alcohol and primary iso-amyl alcohol. Among the suitable hydrocarbons are benzine and toluene. Among the ethers that are useful are di-butyl ether and di-iso-butyl ether. Among the ketones that are useful are methyl iso-propyl ketone, methyl iso-butyl ketone and methyl-n-amyl ketone. Alkyl halides may also be used, if desired.

For a better understanding of the present invention, reference may be had to the accompanying drawings in which.

In accordance with the present invention, substantially water-free lactic acid may be flash esterified with about 3 to 20 parts of an alcohol in the presence of sufficient sulfuric acid to give the mixture a pH value between 0.7 and 1.4. The lactic acid can be of any grade and is concentrated to a substantially water-free condition. By "substantially water-free" we mean less than 25% water. There are fewer solid impurities present in the mixture than when an alkali salt is used, but the flash-esterification operation hereinafter described may be used to separate the volatiles from any non-volatile impurities that may be present. Crude lactic acid which can be treated successfully by this method contains substantial amounts of such non-volatile impurities.

Figure 1:
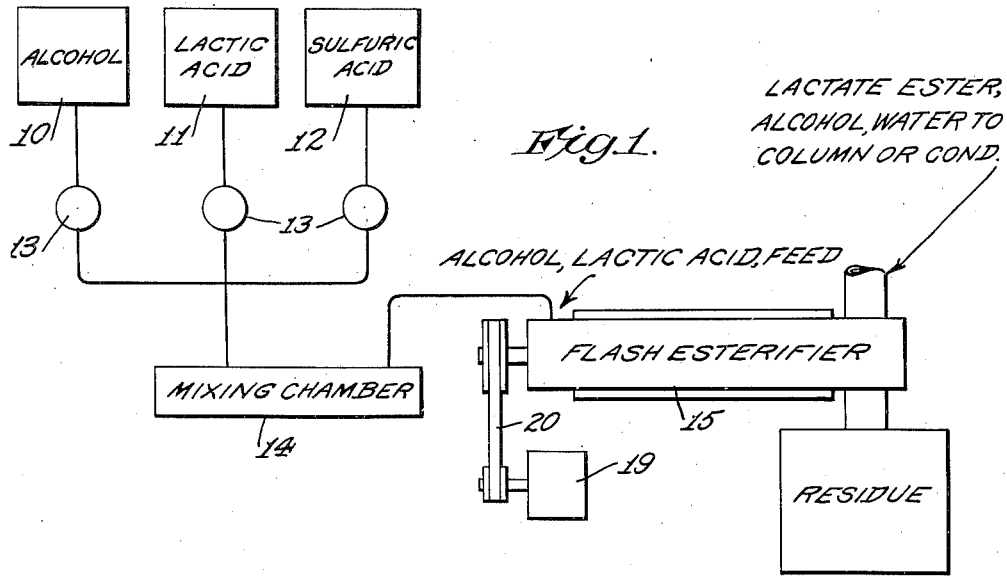
Figure 1 is a flow sheet diagrammatically illustrating the method.
Figure 2:
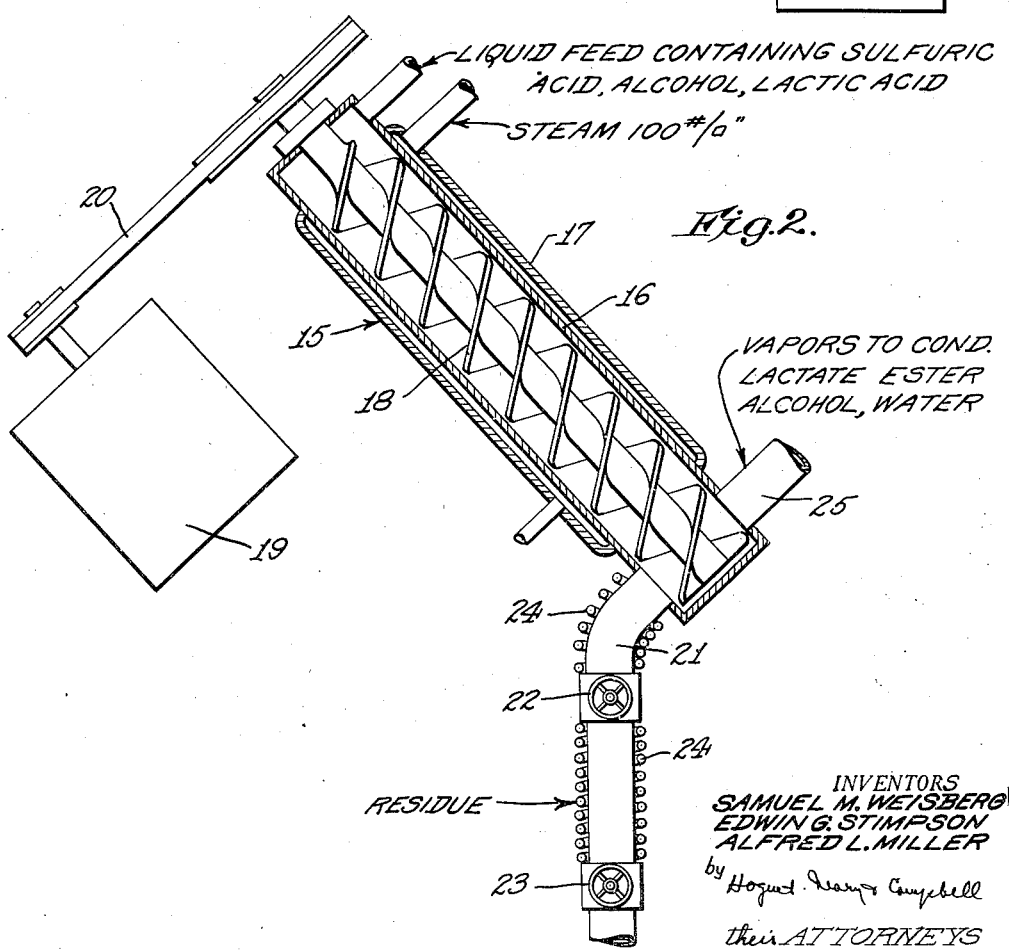
Fig. 2 is a view in vertical cross-section of a typical form of device for flash esterifying the mixture.

Referring now to Figure 1, the alcohol, lactic acid and sulfuric acid may be stored in suitable storage tanks 10, 11 and 12, respectively, from which they may be delivered continuously by means of proportioning pumps 13 to a mixing chamber 14 wherein the alcohol, lactic acid and sulfuric acid are intimately mixed and the pH value of the mixture adjusted to between about 0.7 and 1.4. The mixture may be heated during its passage through the mixing chamber 14, if desired, and then may be delivered continuously into a flash esterifier 15 which is maintained at a temperature well above the boiling point of the mixed vapors of the ester, alcohol and water. As shown in Figure 2, the flash esterifier may consist of a cylinder 16 having a jacket 17 extending throughout the major portion of its length for receiving super-heated steam. The temperature of the steam and the temperature in the cylinder will depend largely upon the boiling point of the mixture of the ester and other volatile components and the heat required to raise the temperature of the mixture suddenly to its boiling point. For the esterification of methyl lactate, for example, steam should be supplied to the jacket 17 at about 100 pounds pressure.

Within the cylinder 16 is mounted a screw conveyor 18 which is driven by means of an electric motor 19 through suitable power transmission means, such as the belt drive 20 illustrated.

The conveyor 18 is utilized for moving any solid components that are present in the mixture or formed during the esterification reaction from one end of the cylinder 16 to the other so that it may be discharged continuously from the cylinder. Preferably, the conveyor 18 is rotated at about 200 revolutions per minute in order to throw the solid components outwardly against the walls of the cylinder 16 to assure it being heated to a sufficiently high temperature to give up any ester occluded therein. The cylinder is provided with a discharge outlet 21 which communicates with a pair of spaced apart gate valves 22 and 23 forming a solids-receiving chamber between them through which the solids may be discharged without escape of any substantial amount of the vapor therethrough. As illustrated, the discharge outlet 21 is surrounded by a steam coil 24 which holds the solids-receiving chamber at such a temperature as to prevent the condensation of vapor therein.

The vapor may be discharged through another outlet 25 and delivered to a condenser, not shown.

After condensation, the mixture of ester, excess alcohol and water may be heated to distill off the alcohol and the mixture of ester and water treated to remove the water. If the alkyl lactate is water-insoluble, the water can be removed by decantation. Water-soluble esters can be rendered anhydrous by distilling the water as an azeotropic mixture as described above and as disclosed more particularly in the Weisberg et al. application Serial No. 468,184.

From the preceding description of typical methods embodying the present invention, it will be clear that a continuous method of preparing alkyl lactates has been provided whereby an increased rate of production is obtained. Moreover, less complicated apparatus is required for practicing the method and control of the operation is reduced to minimum complexity. More economical production of the ester results, inasmuch as only the chemicals required in the reaction are added. Thus, the use of an alkali to neutralize the mixture of ester, alcohol and acid, following esterification, is unnecessary.

While it is preferred to use apparatus of the type described generally above because of the advantages of continuously and readily controlled operation, it will be understood that the mixture may be formed in separate batches and these batches supplied continuously to the flash esterifier. It will be understood, further, that other types of flash esterifying apparatus may be used than that described above, such as, for example, an esterifying apparatus utilizing a heated inert liquid into which the mixture is sprayed or injected or a system in which the mixture is superheated under increased pressure and then suddenly relieved of pressure to flash vaporize the volatiles and separate them from the solids. Moreover, the volatiles delivered from the flash esterifier may be handled with different apparatus and in different ways than that described above. For example, if desired, the volatiles from the flash esterifier may be fractionally condensed in order to separate the alcohol vapor from the water and ester, leaving the mixture of the latter two liquids for subsequent separation by azeotropic distillation.

In view of the many modifications possible in the process and in the apparatus, it will be understood that the above-described apparatus and typical method described above are illustrative and should not be regarded as limiting the scope of the following claims.

We claim:

1. A method of preparing alkyl lactates comprising mixing about 3 to 20 parts of an aliphatic alcohol of the $C_nH_{2n+1}.OH$ series having 1 to 3 carbon atoms, about one part of substantially water-free lactic acid and a sufficient amount of sulfuric acid to provide a pH value between 0.7 and 1.4, raising the temperature of the mixture suddenly to above the boiling point of said alcohol to produce a lactic acid ester of said alcohol and flash vaporize the ester, the alcohol and water.

2. A method of preparing alkyl lactates comprising mixing about one part of lactic acid with about 3 to 20 parts of an alcohol of the $C_nH_{2n+1}.OH$ series having 1 to 3 carbon atoms in the presence of sufficient sulfuric acid to provide a pH value between 0.7 and 1.4, heating the mixture at a temperature below the boiling point of the alcohol, suddenly subjecting said mixture to such conditions of temperature and pressure as to produce substantially instantaneously an alkyl lactate and to flash vaporize the alcohol, alkyl lactate and any water present in the mixture and withdrawing the vapor to separate it from any non-volatile impurities present in the mixture.

3. A method of preparing alkyl lactates which comprises mixing crude, substantially water-free lactic acid, an alcohol of the $C_nH_{2n+1}.OH$ series having 1 to 3 carbon atoms in excess of its theoretical combining proportion with said acid, and sulfuric acid, raising the temperature of the mixture suddenly to above the boiling point of said alcohol to produce a lactic acid ester of said alcohol and flash vaporize the ester and the alcohol and separate them from non-volatile impurities present in said crude lactic acid.

4. A method of preparing alkyl lactates which comprises, mixing crude, substantially water-free lactic acid, an alcohol of the $C_nH_{2n+1}.OH$ series having 1 to 3 carbon atoms in excess of its theoretical combining proportion with said acid and sufficient strong mineral acid to provide a pH value between about 0.7 and 1.4, and suddenly subjecting said mixture to such conditions of temperature and pressure as to flash esterify said alcohol and said acid and to flash vaporize the volatile components and separate them from non-volatile impurities present in said mixture.

5. A method of preparing methyl lactate which comprises mixing about one part of crude, substantially water-free lactic acid and about 3 to 20 parts of methyl alcohol and sufficient sulfuric acid to produce a pH value between about 0.7 and 1.4 in said mixture, suddenly subjecting said mixture to a sufficiently high temperature and such pressure as to flash vaporize said alcohol and to produce methyl lactate which is entrained by said alcohol vapor to separate them from non-volatile impurities in said mixture.

6. A method of preparing methyl lactate which comprises mixing about one part of crude, substantially water-free lactic acid, about 3 to 20 parts of methyl alcohol, and sufficient sulfuric acid to produce a pH value between about 0.7 and 1.4 in said mixture, heating said mixture to about 150° F. and suddenly raising the temperature of the mixture to above the boiling point of said alcohol to produce methyl lactate and to flash vaporize said alcohol and ester to separate them from non-volatile components in said mixture.

SAMUEL M. WEISBERG.
EDWIN G. STIMPSON.
ALFRED L. MILLER.

REFERENCES CITED

The following references are of record in the file of this patent:

UNITED STATES PATENTS

| Number | Name | Date |
| --- | --- | --- |
| 1,421,604 | Steffens | July 4, 1922 |
| 2,029,694 | Bannister | Feb. 4, 1936 |
| 2,095,496 | Gerg | Oct. 12, 1937 |
| 2,334,524 | Wenker | Nov. 16, 1943 |

OTHER REFERENCES

Tidwell et al.: J. Am. Chem. Soc., vol. 53 (1931), pages 4353–4358.